UNITED STATES PATENT OFFICE.

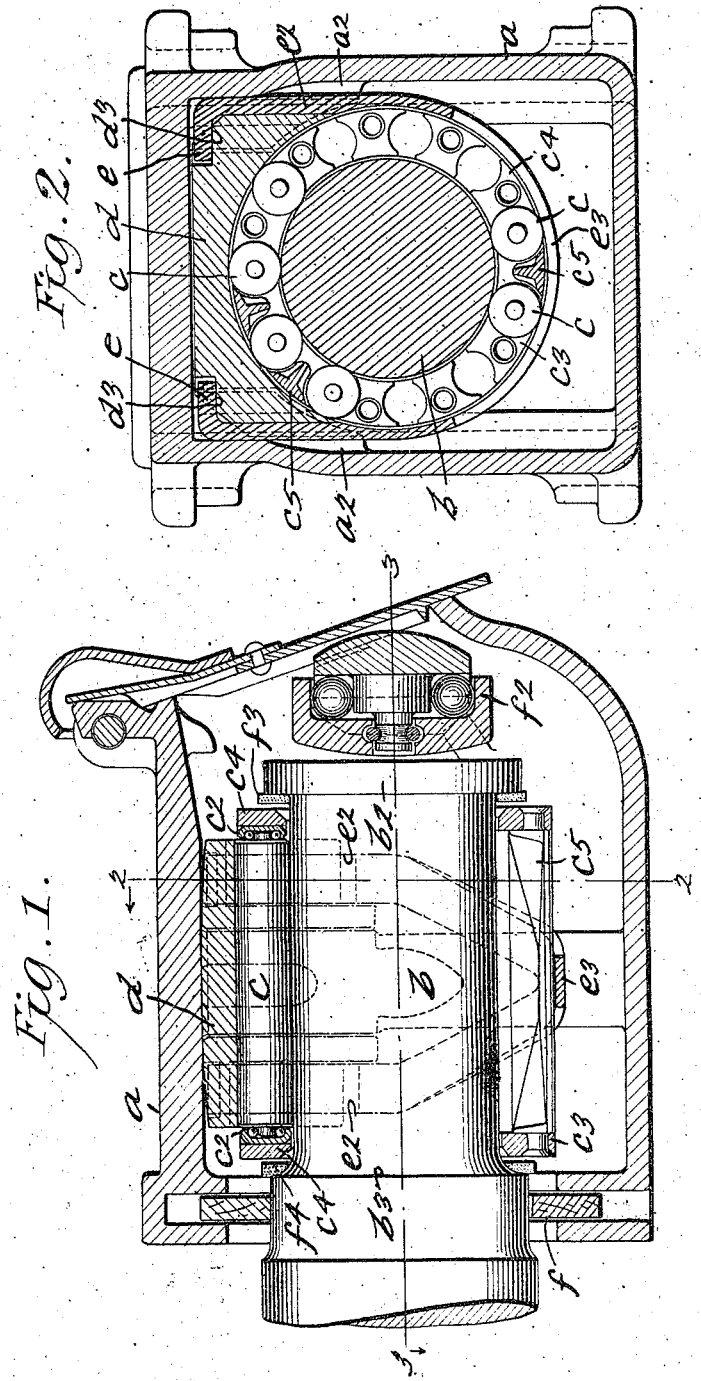

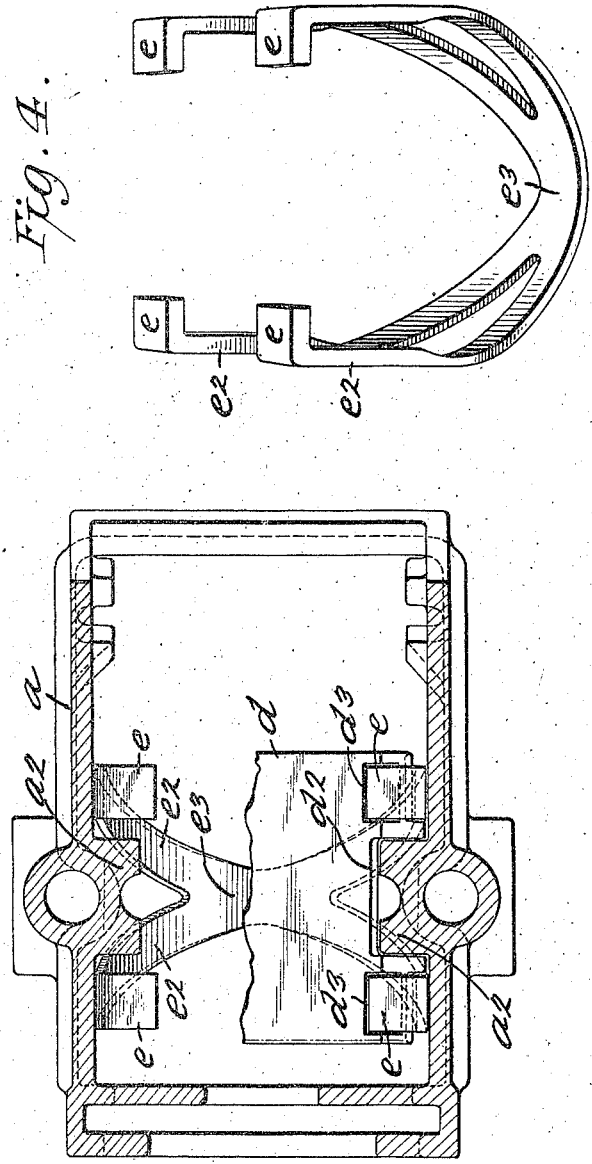

JULIUS A. PERKINS, OF NEW YORK, N. Y.

BEARING FOR ROLLERS.

1,254,350.

Specification of Letters Patent. Patented Jan. 22, 1918.

Application filed March 12, 1913, Serial No. 753,700. Renewed June 15, 1917. Serial No. 175,038.

*To all whom it may concern:*

Be it known that I, JULIUS A. PERKINS, a citizen of the United States of America, and residing at New York, in the county of New York and State of New York, have invented certain new and useful Improvements in Bearings for Rollers, of which the following is a specification, such as will enable those skilled in the art to which it appertains to make and use the same.

This invention relates to roller bearings, with a particular reference to the use thereof in car journal boxes, as, for instance, in that form shown in my Letters Patent of the United States numbered 1,002,442, and bearing date of September 5, 1911, with the distinction, however, that my present invention is adapted for use in journal boxes not provided with the roller supporting tracks shown in the said Letters Patent.

Some equivalent of the said roller supporting tracks is, however, practically essential where the rollers pass over open spaces in the bottom of the journal box, as shown, in order to prevent the centrifugal effect upon the roller alining balls at the roller ends which would occur if the rollers flew off into space where no supporting means were provided; also to allow the rollers to re-aline themselves by supporting them at changing points in the lengths thereof while passing over such spaces, and also to make the angle of approach of the rollers between the journal and the bearing members so gradual that the journal gets a "bite" on the rollers and the latter roll under the load without any strain upon the cage or ball bearings at the ends of the rollers.

Further, scale or foreign matter may lodge upon the rollers in their planetary movement, and it is therefore advisable to so form the supporting element as to permit a clearance of the entire roller length to permit the escape of such matter from the rollers into the box bottom, this being accomplished in my present form by making the supporting element of two straps, shown convergent for a portion of their lengths and joined beneath the roller bearing cage, this construction also permitting the roller re-alinement above referred to and, my roller supporting means being entirely independent of the box, no change is required in the latter over the conventional form now in use other than curving the lower portions of the side lugs concentric with the journal of the axle.

My invention is fully set forth in the following specification, of which the accompanying drawings from a part, in which the separate parts are designated by the same reference characters in each of the views, and in which:—

Figure 1 is a central, vertical, longitudinal section through a car journal box provided with my invention;

Fig. 2 is a section on the line 2—2 of Fig. 1, some of the rollers being omitted and none sectioned;

Fig. 3 is a section on the line 3—3 of Fig. 1, but showing the roller supporting means in their entirety at one end thereof and in connection with their suspension means at the opposite end thereof; and Fig. 4 is a detached, perspective, view of my present form of roller supporting means.

In the drawings forming a part of this application I have shown a car journal box $a$, of conventional or other form, but provided with the usual side lugs $a^2$ for use with the conventional brass and wedge frictional bearings, the lower portion of said lugs curved concentric with the axle $b$, as indicated in dotted lines in Fig. 2, and said axle is provided with an end flange $b^2$ and an inner shoulder $b^3$ in the usual manner.

Arranged about the journal of the axle $b$ are a plurality of rollers $c$ having anti-frictional bearing blocks $c^2$ at the ends thereof seated in corresponding recesses in a cage $c^3$ comprising end plates $c^4$ and connecting ribs $c^5$, but the specific cage construction forms no part of this invention.

Within the box, above the journal of the axle, is a block $d$, concaved on its lower surface concentric with the journal and serving as a bearing member for the rollers $c$ to take the load, said block being provided with side recesses $d^2$, as shown in Fig. 3, arranged approximately midway of the length of said block and adapted to receive the lugs $a^2$ of the box in order to render said block incapable of endwise movement in the box, and said block is also provided, in the present form, with four recesses $d^3$ in the upper surface thereof, two on each side of and close to the ends of said block.

Resting in each of the recesses $d^3$ is the angularly bent end $e$ of each of two straps $e^2$ which are substantially vertical from the ends thereof to a point in the approximate horizontal axial plane of the journal, from which points the straps are concentric with the journal, or approximately so, a very slight clearance being provided for to permit of the insertion and removal of the cage of rollers without canting the straps $e^2$ and, by reference to Figs. 1, 3 and 4, it will be seen that the straps converge toward the bottom of the axle and are joined at $e^3$ in the vertical axial plane of the axle, preferably integrally although not necessarily, thus providing a bearing for the rollers which permits of the entire clearance of the latter in their planetary movement to permit scale or foreign matter to escape from the rollers and fall to the refuse receptacle in the box bottom.

In assembling, the block $d$ and roller supporting means $e^2$ are introduced into the box from the open front end, and the block $d$ arranged in proper position with respect to the lugs $a^2$, after which the axle with the cage of rollers thereon is entered from the inner box end and passed through the supporting means $e^2$, a dust guard $f$ being next installed if desired, but this bears no relation to the present invention, and I may also provide an axle end-thrust device $f^2$ which is installed after the bearings are assembled in the box, some sort of end-thrust being practically essential in the use of roller bearings, and I also prefer to provide floating cage controllers $f^3$ and $f^4$ at the cage ends to take any cage endwise movement in a glancing and substantially anti-frictional manner, and, as shown in Fig. 1, I prefer to slightly curve the upper surface of the block $d$, from front to rear, to permit a slight rocking movement thereof to compensate for axle movement in the box due to irregularity of track and consequent vertical movement of the car provided with my invention.

It will thus be seen that I provide a roller supporting device which is entirely independent of the box, which permits a clearance of objectionable matter from the rollers, which is quickly and easily installed, and which is very inexpensive and adaptable to conventional boxes in which it is desired to substitute roller bearings for the usual brass and wedge frictional bearings, and which also permits the rollers to re-aline themselves in the event of their having been forced out of alinement for any reason and, while I have shown a present preferred form of embodiment of the invention, it will be obvious that I am not limited thereto but may make various changes therein and thereover to meet varying conditions within the scope of the following claims.

Having fully described my invention, what I claim as new, and desire to secure by Letters Patent, is:—

1. A car journal box, an axle therein, a series of rollers about said axle, a roller bearing member in the top of said box and a detachable roller supporting strap having inwardly turned upper ends overlying said member adjacent each end of said rollers.

2. A car journal box, an axle therein, a series of rollers about said axle, a roller bearing member in the top of said box, and a roller supporting strap suspended from said member adjacent each end of said rollers, said straps being vertically arranged for a portion of their lengths and converging toward the lower side of said axle.

3. A car journal box, an axle therein, a series of rollers about said axle, a roller bearing member in the top of said box, and a roller supporting member suspended therefrom, said supporting member comprising a central lower portion having upwardly directed, divergent, arms connected therewith and being concentric with said axle beneath the horizontal, axial, plane of said axle.

4. A car journal box, an axle therein, a series of rollers about said axle, a roller bearing member in the top of said box provided with recesses in the upper surface thereof, and a roller supporting strap arranged adjacent each end of said rollers and the upper ends of which are inwardly turned and rest in corresponding recesses, said straps being joined beneath said axle at the centers of said rollers.

In testimony that I claim the foregoing as my invention I have signed my name in presence of the subscribing witnesses this 10th day of March, 1913.

JULIUS A. PERKINS.

Witnesses:
F. ELLIS BROWNE,
H. C. KOPF.